Sept. 6, 1960  N. R. HIBBARD  2,951,578

RUBBER PAD ATTACHMENT FOR CONVEYOR CHAIN

Filed Feb. 11, 1959

United States Patent Office

2,951,578
Patented Sept. 6, 1960

2,951,578

RUBBER PAD ATTACHMENT FOR CONVEYOR CHAIN

Nelson R. Hibbard, Springfield, Mass., assignor to Chain Belt Company, Milwaukee, Wis., a corporation of Wisconsin Filed Feb. 11, 1959, Ser. No. 792,516

3 Claims. (Cl. 198—189)

This invention relates to conveyor chain for carrying large sheets of rigid material, such as glass or sheet metal, without marring their polished or painted surfaces. The invention is particularly directed to a simple and novel manner of securing rubber pads to the chain to engage and support the sheets without their touching the chain. Customarily a number of such chains are set in spaced, parallel relation to support the sheets and each chain rides on fixed rails or tracks between the sprockets over which the chain operates.

When the rubber pads become worn and must be replaced, the conveyor and entire operation with which it is associated must be shut down. Replacement of the large number of rubber pads involved is a time-consuming job which is both tedious and expensive.

According to the invention, the pin links of the chain extend on both sides of the chain through holes formed in the rubber pads and each end of each pin is headed to round the pin end and form a surrounding burr. The rubber pads are placed on the pins alongside the outer or cap-plates of the chain. Although the pads are easy to push over the heads and onto the pins, and are readily removed by prying with only a small additional effort, the easily formed, small burr extending around the pin head is nevertheless surprisingly effective for securing the pads on the pins. The force applied to the pad which would tend to push the pad off of the pins compresses the rubber against the pin at the burr. The pad cannot jump over the burr even though the burr forms a relatively small abutment.

The drawings furnished herewith illustrate the best mode of carrying out the invention as presently contemplated and set forth hereinafter.

Figure 1:
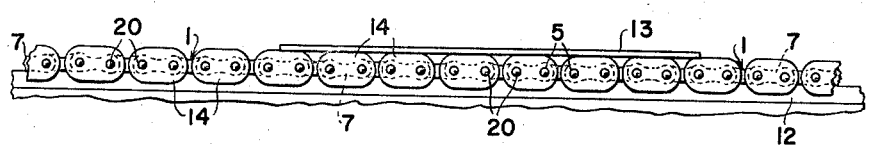
Figure 1 is a reduced-scale, side-view of a length of the chain supported on a portion of track and supporting a rigid sheet.
Figure 2:
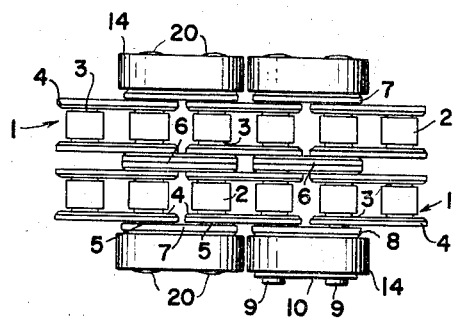
Fig. 2 is a plan view of several pitches of the chain and includes one pitch fitted with a clip allowing removal of the pins for installation and removal of the chain.
Figure 3:
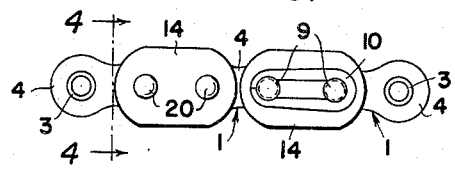
Fig. 3 is a side view of the chain shown in Fig. 2.
Figure 6:
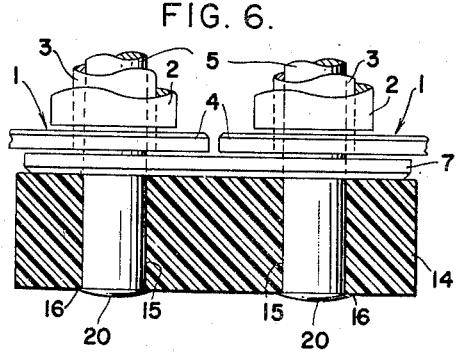
Fig. 6 is an enlarged plan of a part of one chain pitch and showing the pad in section.

The chain shown in the drawing is a two-strand roller chain including the two rows of bushing links which carry the rollers 2. Each bushing link 1 comprises two bushings 3 and two bushing plates 4. Plates 4 are fixed on the ends of the bushings 3 with the rollers 2 therebetween and turnable on the bushings. The pins 5 extending through corresponding bushings 3 are turnable therein for articulation of the chain, as over a sprocket, not shown.

The pins 5 extending through adjacent bushing links 1 are connected by the spacer plates 6 and the cap plates 7. Plates 6 are assembled in pairs between links 1. The cap-plates 7 overlie the links 1 along each side of the chain. Pins 5 fit tightly within cap plates 7 so that there is no relative movement or rotation therebetween or between the two pins 5 of the corresponding plates 6 and 7. Each set of adjoining links 1 and each set of pins 5 and plates 6 and 7 are referred to generally as pitches of the chain.

One pitch of the chain may include the cap plate 8 having a relatively loose fit with the pins 9 allowing their removal for opening the chain so that it can be installed or removed for replacement. Pins 9 are similar to pins 5 except that one end of each pin 9 is fitted to receive the removable clip 10 which serves to secure the pins in place during the operation of the chain.

The chain operates over sprockets not shown, having teeth engaging the rollers 2 which also ride on the parallel tracks or rails 11 carried by the frame member 12. The sheet 13, as shown in Figure 1, rests on the rubber pads 14 mounted on the projecting end portions of pins 5. Each pad 14 comprises a resilient member of molded rubber or synthetic material having spaced holes 15 to receive and fit the pins 5. Each pad 14 is mounted on two pins 5 alongside a cap-plate 7 having no relative movement.

Figure 7:
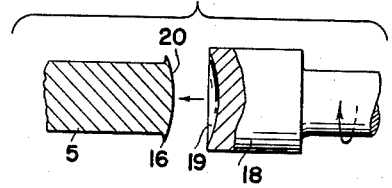
Fig. 7 is an enlarged, diagrammatic view showing the method of forming the end of the pin.
Figure 4:
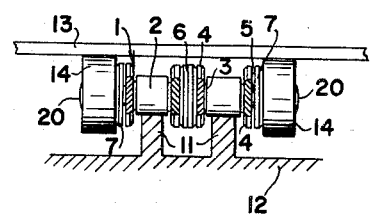
Fig. 4 is a section taken on line 4—4 of Fig. 3 and also shows in section the track for the chain.
Figure 5:
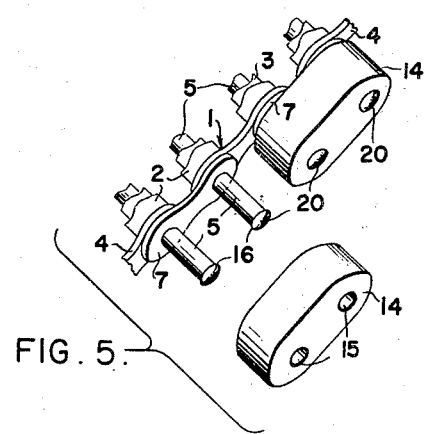
Fig. 5 is a perspective view of the chain showing one pad removed and one pad in place on the chain pins alongside an outer or cap-plate.

According to the invention, each pad 14 is secured by the small burr 16 which is developed by heading the pin, for example only, as shown in Fig. 7.

The tool 18 has a concave face 19 which is pressed against the end of the pin 5. The rotation of the tool and the force applied heats the end slightly but generally heads the pin by cold-working or swaging. The heading provides the pin with a round end face 20 and the displaced metal forms the irregular, but sharp projection or burr 16 around the face.

The burr extends generally in a direction which allows each pad 14 to be readily installed on the chain by pressing the pad over the heads of the pins. Each pad is dimensioned so that it extends beyond the height of the chain so that when the tops of the pads have worn to a given degree the entire chain may be reversed to present the opposite side of the pads for wear. When both sides of the pads have been used, the pads must be replaced.

Removal of the chain may or may not be required or desirable and the simplified removal of all of the pads (except the one between cap plate 8 and clip 10) generally eliminates the need of removing the chain.

Each pad is removed by inserting a tool, not shown, between the pad and the cap-plate and turning the tool to pry the pad from the pins. In doing so, the pins 5 including burrs 16 are in no way damaged but are left so that new pads may be immediately pressed on the pins as described.

In the operation of the chain conveyor a lateral force applied by the sheets to the pads pushes the pads against the cap-plates on one side of the chain and pushes the opposite pads against the burrs which "dig" into the rubber to hold the pads and virtually prevent the pads from sliding over the ends of the pins. For that reason it is desirable that the pads be placed on the pins alongside the chain side-plates or cap-plates 7 so that the pins do not rotate in the pads and enlarge the holes in the pads.

The invention may be used with chain of any number of strands.

Various modes of carrying out the invention are contemplated as within the scope of the following claims particularly pointing out and distinctly claiming the subject matter which is regarded as the invention.

I claim:

1. In a conveyor for transporting sheets of rigid material over parallel guide rails but without marring, a chain comprising a series of links having rollers for engaging said rails and a series of plates having pins extending through said rollers and links, said links and said rollers being rotatable on the pins, said plates being fixed on the pins, said pins having projecting end portions, each end of each pin being rounded and having a circumferential overhanging burr, and a resilient pad having spaced holes and mounted alongside the outermost plate on the projecting portions of the respective pins with said pins extending through the corresponding holes of the pad, said pads having top surfaces higher than the chain to engage the lower surface of said material and said pads being secured by said burrs on the pins in the normal operation of the conveyor but allowing the pads to be forcibly removed for replacement.

2. In a conveyor chain having resilient pads for carrying sheets of rigid material without marring, said chain including a series of pin links, each said pin link comprising a pair of pins and a pair of plates fixed on said pins, said pins having projecting end portions and a resilient pad having spaced holes and mounted on the projecting portions of each two adjacent pins with said pins extending through the holes, said pins having rounded ends and projecting burrs extending around the ends and said pads are secured by said burrs on the pins in the normal operation of the conveyor but allowing the pads to be forcibly removed for replacement, each said pad being assembled on the corresponding ends of the pins of the same pin link and alongside the pin plate which secures the pins against relative rotation and prevents their rotation relative to the pad.

3. In a conveyor chain with resilient pads having top sides for carrying sheets of rigid material without marring, said chain comprising a series of links and pins, said pins having projecting end portions and a resilient pad having spaced holes and mounted on the projecting portions of each two pins of the same link with said pins extending through said holes, said pads being symmetrical with respect to said holes so that when said top sides are worn the chain may be reversed to dispose the opposite sides upwardly for carrying the material, each end of each pin being rounded and provided with a circumferential, overhanging burr, said pads being secured by said burrs on the pins in both positions of the chain and the normal operation of the conveyor and allowing the pads to be forcibly removed for replacement.

References Cited in the file of this patent

UNITED STATES PATENTS

| | | |
|---|---|---|
| 1,737,150 | Davis | Nov. 26, 1929 |
| 1,746,697 | Eaglesfield | Feb. 11, 1930 |